United States Patent
Han et al.

(10) Patent No.: US 9,383,962 B2
(45) Date of Patent: Jul. 5, 2016

(54) INPUT DEVICE, DISPLAY APPARATUS, AND METHOD OF CONTROLLING THE INPUT DEVICE

(71) Applicant: SAMSUNG ELECTRONICS CO., LTD., Suwon-si (KR)

(72) Inventors: Young-ran Han, Seoul (KR); Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 14/194,062

(22) Filed: Feb. 28, 2014

(65) Prior Publication Data

US 2014/0347290 A1 Nov. 27, 2014

(30) Foreign Application Priority Data

May 22, 2013 (KR) .................... 10-2013-0057996

(51) Int. Cl.
*G06F 3/16* (2006.01)
*G06F 3/046* (2006.01)
*G06F 3/0488* (2013.01)
*G06F 3/038* (2013.01)
*G06F 3/041* (2006.01)
*G06F 3/0484* (2013.01)
*G06F 3/0354* (2013.01)

(52) U.S. Cl.
CPC *G06F 3/16* (2013.01); *G06F 3/038* (2013.01); *G06F 3/0383* (2013.01); *G06F 3/03545* (2013.01); *G06F 3/046* (2013.01); *G06F 3/0416* (2013.01); *G06F 3/0488* (2013.01); *G06F 3/04845* (2013.01); *G06F 3/167* (2013.01); *G06F 2203/0381* (2013.01)

(58) Field of Classification Search
CPC ............ G06F 3/03545; G06F 3/04883; G06F 3/04886; G06F 3/041
See application file for complete search history.

(56) References Cited

U.S. PATENT DOCUMENTS 8,628,478 B2 * 1/2014 Wolfe .................... A61B 5/024
600/509
2003/0132950 A1 * 7/2003 Surucu .................. G06F 1/1626
715/700

(Continued)

FOREIGN PATENT DOCUMENTS

EP 0622724 A2 11/1994
EP 1762926 A2 3/2007

OTHER PUBLICATIONS

Communication dated Oct. 12, 2015, issued by the European Patent Office in counterpart European Application No. 14155605.0.

*Primary Examiner* — Ricardo L Osorio
(74) *Attorney, Agent, or Firm* — Sughrue Mion, PLLC

(57) ABSTRACT

An input device, a display apparatus and a method of controlling the input device are provided. The input device includes: a communicator configured to communicate with a display apparatus; a sensor configured to sense a sound; a volume extractor configured to extract volume sections from the sound sensed by the sensor; and a controller configured to determine whether a peak level of each of the volume sections extracted by the volume extractor exceeds a threshold level, and in response to determining the peak level of a volume section among the volume sections exceeds the threshold level, control the communicator to generate an event signal for cancelling a job for a pattern image displayed on the display apparatus based on a touch input and transmit the event signal to the display apparatus.

22 Claims, 14 Drawing Sheets

(56) References Cited

U.S. PATENT DOCUMENTS

| | | | | |
|---|---|---|---|---|
| 2005/0289310 A1* | 12/2005 | Miki | ............. | G06F 3/061 711/162 |
| 2008/0144864 A1* | 6/2008 | Huon | ............. | H04R 1/20 381/305 |
| 2008/0185432 A1* | 8/2008 | Caballero | ............. | G06F 11/0742 235/435 |
| 2011/0289596 A1* | 11/2011 | Sebesta | ............. | G06F 3/0622 726/28 |
| 2015/0235670 A1* | 8/2015 | Kim | ............. | G11B 27/034 386/278 |

* cited by examiner

INPUT DEVICE, DISPLAY APPARATUS, AND METHOD OF CONTROLLING THE INPUT DEVICE

CROSS-REFERENCE TO RELATED APPLICATION(S)

This application claims priority from Korean Patent Application No. 10-2013-0057996, filed on May 22, 2013, in the Korean Intellectual Property Office, the disclosure of which is incorporated herein by reference, in its entirety.

BACKGROUND

1. Field

Methods and apparatuses consistent with exemplary embodiments generally relate to providing an input device, a display apparatus, and a method of controlling the input device, and more particularly, to providing an input device that controls an operation of a display apparatus according to a sound intensity, a display apparatus, and a method of controlling the input device.

2. Description of the Related Art

A display apparatus, such as an electronic bulletin board, displays a pattern image, such as handwriting or a picture, on a touch screen according to a touch input of an input device, such as an electronic pen.

When a user performs a job with respect to the pattern image based on the touch input of the input device, the user may perform an editing job with respect to the pattern image. In this case, the user executes an application provided by the display apparatus that is related to the editing job, in order to select a menu related to the editing job. In response to a particular area of the pattern image being selected by using the input device and being completely edited, the user selects a menu to return to an original function in order to re-perform the job with respect to the pattern image.

In response to a job related to the pattern image being performed on the touch screen of the display apparatus as described above, various jobs may be required to be performed for the pattern. Whenever the various jobs are required, the user may select a menu related to a corresponding job.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide convenient and intuitive performing of various jobs related to a pattern image on a touch screen of a display apparatus by using an input device.

According to an aspect of an exemplary embodiment, there is provided an input device including: a communicator configured to communicate with a display apparatus; a sensor configured to sense a sound; a volume extractor configured to extract volume sections from the sound sensed by the sensor; and a controller configured to determine whether a peak level of each of the volume sections extracted by the volume extractor exceeds a threshold level, and in response to determining the peak level of a volume section among the volume sections exceeds the threshold level, control the communicator to generate an event signal for cancelling a job for a pattern image displayed on the display apparatus based on a touch input and transmit the event signal to the display apparatus.

The controller may be configured to generate an event signal that is to gradationally cancel jobs for sections of the pattern image according to a time for which the volume section exceeding the preset threshold level is maintained.

In response to the time for which the volume section exceeding the preset threshold level is maintained being less than or equal to a preset threshold time, the controller may be configured to generate a first event signal that cancels a job for a preset first section based on one of coordinate values last stored in the display apparatus in relation to the pattern image.

In response to the time for which the volume section exceeding the preset threshold level is maintained exceeding the preset threshold time, the controller may generate a second event signal that cancels a job for a second section that is wider than the first section based on one of the coordinate values last stored in the display apparatus.

The coordinate values stored in the display apparatus may be coordinate values that are detected from points of the touch screen of the display apparatus that are touched in relation to the pattern image.

According to an aspect of another exemplary embodiment, there is provided an input device configured to control a display apparatus that recognizes a magnetic field signal to sense a touch input and displays a pattern image based on the touch input, the input device including: a signal generator configured to generate the magnetic field signal; a sensor configured to sense a sound; a volume extractor configured to extract volume sections from the sound sensed by the sensor; and a controller configured to determine whether a peak level of each of the volume sections extracted by the volume extractor exceeds a threshold level, and in response to determining that the peak level of a volume section among the volume sections exceeds the threshold level, control the signal generator to generate a magnetic field signal for cancelling a job for the pattern image displayed on the display apparatus.

The controller may control the signal generator to gradationally generate a magnetic field signal for cancelling the job according to a time for which a volume section exceeding the preset threshold level is maintained.

In response to the time for which the volume section exceeding the preset threshold level is maintained being less than or equal to a preset threshold time, the controller may control the signal generator to generate a first magnetic field signal that is to cancel a job for a preset first section based on a one of coordinate values last stored in the display apparatus in relation to the pattern image.

In response to the time for which the volume section exceeding the preset threshold level is maintained exceeds the preset threshold time, the controller may be configured to control the signal generator in order to generate a second magnetic field that is used to cancel a job for a second section that is wider than the first section, based on one of the coordinate values last stored in the display apparatus.

According to another aspect of the exemplary embodiments, there is provided a display apparatus including: a communicator configured to communicate with an input device; an input unit configured to receive a touch input of the input device; a display configured to display a pattern image based on the touch input of the input device; and a controller configured to control the display to display the edited pattern image based on the received event signal in response to an event signal for cancelling a job being received from the input device through the communicator.

According to an aspect of another exemplary embodiment, there is provided a display apparatus including: a signal receiver configured to receive a magnetic field signal output from an input device; a sensor configured to process the received magnetic field signal in order to sense a touch area of the input device; a display configured to display a pattern image based on the sensed touch area; and a controller configured to, in response to a particular magnetic field signal different from the magnetic field signal being received through the signal receiver, control the display unit to display the pattern image edited according to whether the particular magnetic field signal is a signal related to a cancellation of a job for the pattern image.

According to an aspect of another exemplary embodiment, there is provided a method of controlling an input device. The method may include: sensing a sound; extracting volume sections from the sensed sound; determining whether a peak level of each of the extracted volume sections exceeds a preset threshold level, and in response to their being a volume section exceeding the preset threshold level, generate an event signal that is used to cancel the job for the pattern image displayed in a display apparatus based on a touch input; and transmitting the event signal to the display apparatus.

The generating of the event signal may include: generating the event signal that is to gradationally cancel jobs for sections of the pattern image according to a time for which a volume section exceeding the preset threshold level is maintained.

The generating of the event signal may include in response to a time in which the volume section exceeding the preset threshold level is maintained is less than or equal to a preset threshold time, generating a first event signal that is to cancel a job for a preset first section based on a lastly stored one of coordinate values stored in a display apparatus in relation to the pattern image.

The generating of the event signal may include in response to the period of time exceeding the preset threshold time, generating a second event signal that is to cancel a job for a second section wider than the first section based on the lastly stored one of the coordinate values stored in the display apparatus.

The coordinate values stored in the display apparatus may be coordinate values that are detected from points of a touch screen of the display apparatus that are touched in relation to the pattern image.

According to an aspect of another exemplary embodiment, there is provided a method of controlling an input device configured to control a display apparatus that recognizes a magnetic field signal to sense a touch input and displays a pattern image based on the touch input, the method including: sensing a sound; extracting volume sections from the sensed sound; determining whether a peak level of each of the extracted volume sections exceeds a threshold level; and in response to determining that the peak level of a volume section among the volume sections exceeds the threshold level, generating a magnetic field signal for cancelling a job for the pattern image displayed on the display apparatus.

The magnetic field signal may be gradationally generated and output to cancel the job according to a time for which the volume section exceeding the preset threshold level is maintained.

The generating and outputting of the magnetic field signal may include in response to the time for which the volume section exceeding the preset threshold level is maintained being less than or equal to a preset threshold time, generating a first magnetic field signal that is to cancel a job for a preset first section based on a lastly stored one of coordinate values stored in the display apparatus in relation to the pattern image.

The generating and outputting of the magnetic field signal may include in response to the time for which the volume section exceeding the preset threshold level is maintained exceeding the preset threshold time, generating a second magnetic field signal that is to cancel a job for a preset second section based on the lastly stored one of the coordinate values stored in the display apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
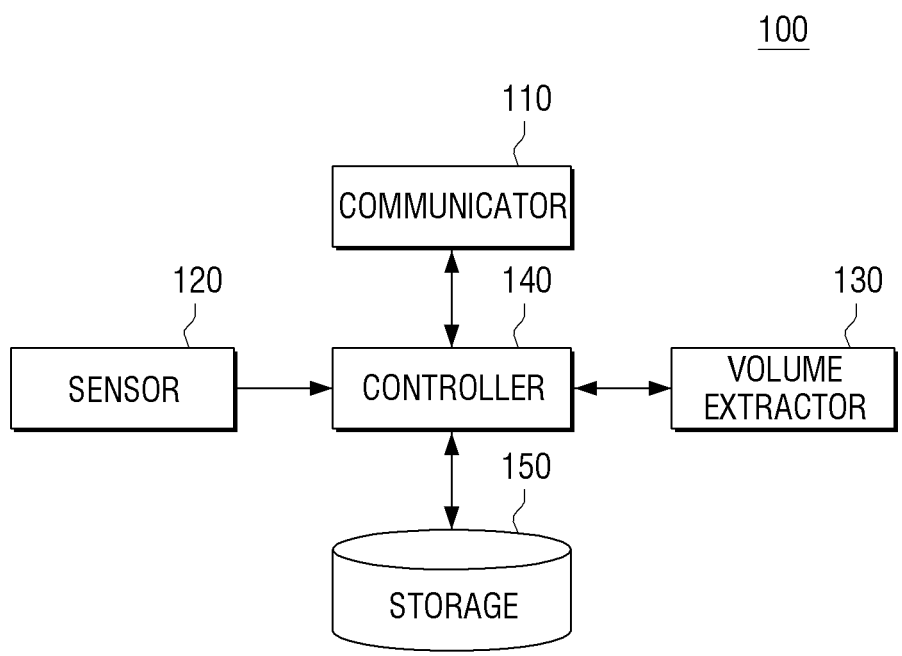
FIG. 1 is a block diagram of an input device according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram of an input device 100 according to an exemplary embodiment.

As shown in FIG. 1, the input device 100 may be a pen type input device such as an electronic pen, a touch pen, or the like, and performs a touch input on a touch screen of a display apparatus 200. The input device 100 includes a communicator 110, a sensor 120, a volume extractor 130, a controller 140, and a storage 150.

The communicator 110 communicates with the display apparatus 200 by wire or wirelessly to transmit and/or receive data with the display apparatus 200. The display apparatus 200 may be an apparatus on which a touch input may be performed like an electronic bulletin board, a smart phone, or a smart TV. The communicator 110 that communicates with the display apparatus 200 may be implemented as a communication module such as a local area wireless communication module (not shown). The LAN module is a communication module that communicates with the display apparatus 200 positioned at a short distance, for example, may be a radio frequency (RF) communication module such as Bluetooth, Zigbee, near field communication (NFC), or the like.

The sensor 120 senses a sound and, in response to a surrounding sound being input through a microphone (not shown), senses the input sound. The volume extractor 130 extracts a volume from the sound sensed by the sensor 120. In particular, in response to the sound being sensed through the sensor 120, the volume extractor 130 removes noise from the sound that is a sensed analog signal. The volume extractor 130 also performs signal-processing with respect to the sound, from which the noise has been removed, in order to convert the sound into a digital signal. The volume extractor 130 performs Fourier Transform with respect to the sound, which has been converted into the digital signal, to detect signal intensity according to a frequency component, in order to extract a volume of the sensed sound.

The controller 140 controls overall operations of elements of the input device 100. In particular, the controller 140 determines whether a peak level of each section of the volume extracted by the volume extractor 130 exceeds a preset threshold level. In response to a determination that a volume section exceeding the preset threshold level exists, the controller 140 controls the communicator 110 to generate an event signal to cancel a job for a pattern image displayed on the display apparatus 200 based on a touch input, and transmits the event signal to the display apparatus 200. Therefore, the communicator 110 may transmit the generated event signal to the display apparatus 200.

In particular, a user may perform a document job, etc., on the touch screen of the display apparatus 200 by using the input device such as an electronic pen. The display apparatus 200 may be a decompression type display apparatus. Therefore, the user may touch the touch screen of the display apparatus 200 with the input device 100 in order to perform the document job, etc. In addition, the display apparatus 200 may sense a touch input of the input device 100 to display a pattern image formed by the touch input on a screen. Therefore, in response to their being a volume section that exceeds a threshold level as described above, the controller 140 may generate an event signal to cancel a job for a pattern image which corresponds to a document job that is currently working and transmit the event signal to the display apparatus 200.

According to another exemplary embodiment, the controller 140 may generate an event signal that is to gradationally perform job cancelling sections of a pattern image displayed on the screen of the display apparatus 200, according to a time at which a volume section exceeding a threshold level is maintained.

According to an exemplary embodiment, a time at which a volume section exceeding a threshold level is maintained may be less than or equal to a preset threshold time. In this case, the controller 140 may generate a first event signal to cancel a job by a preset first section based on one of coordinate values last stored in the display apparatus 200 in relation to a pattern image displayed on the display apparatus 200 and transmit the first event signal to the display apparatus 200.

Therefore, the display apparatus 200 may select a first section of the pattern image displayed on the screen based on the first event signal received from the input device 100. The display apparatus 200 may delete a pattern section which corresponds to a coordinate value belonging to a first section based on one of the coordinate values last stored in relation to the pattern image.

According to another exemplary embodiment, a time at which a volume section exceeding a threshold level is maintained may exceed a preset threshold time. In this case, the controller 140 may generate a second event signal to cancel a job for a second section that is wider than a first section based on one of coordinate values last stored in the display apparatus 200 and transmit the second event signal to the display apparatus 200.

Therefore, the display apparatus 200 may delete the second section of the pattern image displayed on the screen based on the second event signal received from the input device 100. Herein, the display apparatus 200 may delete a pattern section which corresponds to a coordinate value belonging to the second section based on one of the last stored coordinate values in relation to the pattern image.

The coordinate values stored in the display apparatus 200 in relation to the above-described pattern image may be coordinate values that are detected from a point of the touch screen of the display apparatus 200 that is touched by the input device 100.

A threshold value for comparing peak levels of extracted volume sections, a threshold time for comparing times for maintaining volume sections exceeding the corresponding threshold level, and condition information for generating an event signal according to times may be stored in the storage 150. The storage 150 may further store various types of data for driving and controlling the input device 100, an operating system (OS), etc.

Figure 2:
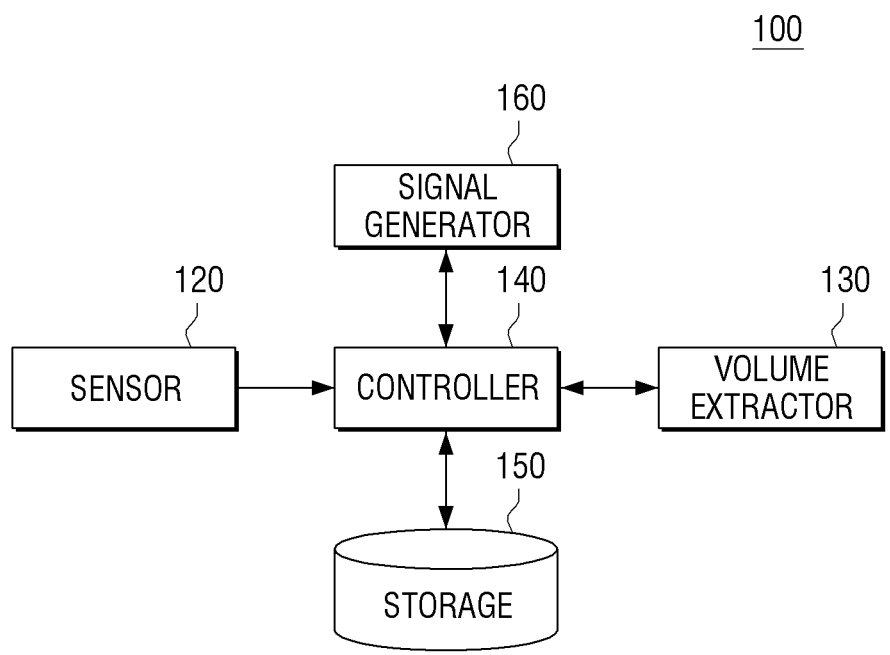
FIG. 2 is a block diagram of an input device according to another exemplary embodiment.

In response to the display apparatus 200 sensing a touch input of the input device 100 by using a capacitive method, the input device 100 may be implemented as shown in FIG. 2.

FIG. 2 is a block diagram of an input device 100 according to another exemplary embodiment.

The display apparatus 200 that is a capacitive type may recognize a magnetic field signal output from the input device 100 to sense a touch input of the input device 100. In this case, as show in FIG. 2, the input device 100 includes a sensor 120, a volume extractor 130, a controller 140, storage 150, and a signal generator 160. The input device 100 generates and outputs the magnetic field signal through the signal generator 160. Therefore, the display apparatus 200 may recognize the magnetic field signal output from the signal generator 160 in order to sense the touch input of the input device 100.

In particular, the input device 100 performs a touch input on the capacitive type display apparatus 200 and the input device may be an electromagnetic resonance (EMR) type electronic pen or an electromagnetic induction (EMI) type electronic pen. The input device 100 receives magnetic energy from a magnetic field formed on a touch screen (not shown) of the display apparatus 200 and stores the magnetic energy in a resonance circuit (not shown). In response to the input device 100 touching a particular point of the touch screen of the display apparatus 200, the signal generator 160 generates and outputs the magnetic field signal by using the magnetic energy stored in the resonance circuit. Therefore, the display apparatus 200 may recognize the magnetic field signal output from the input device 100 to sense the touch input of the input device 100 and recognize a touch point of the input device 100 according to the sensed result.

In response to the touch point of the input device 100 being recognized based on the magnetic field signal output from the input device 100, the display apparatus 200 may display a pattern image that is formed based on the recognized touch point on a screen.

As described above, the controller 140 determines whether a peak level of each volume section extracted by the volume extractor 130 exceeds a preset threshold level. In response to a determination that one of the extracted volume sections exceeds the preset threshold level, the controller 140 controls the signal generator 160 to generate or convert and output a magnetic field signal related to a cancellation of a job for a pattern image displayed on the display apparatus 200. Therefore, the signal generator 160 generates and outputs a magnetic field signal output in relation to the job for the pattern image as a magnetic field signal related to a cancellation of the job for the pattern image. In other words, the signal generator 160 may generate and output a frequency signal which is different from a frequency signal output in relation to the job for the pattern image.

According to another exemplary embodiment, the controller 140 may control the signal generator 160 to gradationally generate or convert a magnetic field signal for a cancellation of a job for a pattern image according to a time at which a volume section exceeding a threshold level is maintained.

According to an exemplary embodiment, the period of time at which the volume section exceeding the threshold level may be less than or equal to a preset threshold time. In this case, the controller 140 may control the signal generator 160 to generate a first magnetic field signal used for cancelling a job by a preset first section based on one of coordinate values last stored in the display apparatus 200 in relation to a pattern image displayed on the display apparatus 200. Therefore, the signal generator 160 may generate and output a first frequency signal that is a first magnetic field signal for cancelling a job for a first section of the pattern image displayed on the display apparatus 200.

The display apparatus 200 may delete the first section of the pattern image displayed on the screen based on the first frequency signal, which is the first magnetic field signal output from the input device 100. The display apparatus 200 may delete a pattern section which corresponds to a coordinate value belonging to the first section based on one of the coordinate values last stored in relation to the pattern image.

According to another exemplary embodiment, the period of time at which the volume section exceeds the threshold level may exceed the preset threshold time. In this case, the controller 140 may control signal generator 160 in order to generate a second magnetic field signal for cancelling a job for a second section that is wider than the first section, based on one of the coordinate values last stored in the display apparatus 200. Therefore, the signal generator 160 may generate and output a second frequency signal, which is the second magnetic field signal, for use in cancelling the job for the pattern image.

The display apparatus 200 may delete a second section of the pattern image displayed on the screen based on the second magnetic field signal received from the input device 100. The display apparatus 200 may delete a pattern section corresponding to a coordinate value belonging to the second section based on one of the coordinate values last stored in relation to the pattern image.

As described above, the input device 100, according to the present exemplary embodiment, recognizes a sound of a user in order to determine whether to cancel the job for the pattern image displayed on the display apparatus 200 and transmit or output a signal for cancelling the job according to the determination result. Therefore, the display apparatus 200 may further intuitively perform an editing job, such as deleting a pattern image that is currently being worked, based on a signal received or output from the input device 100.

The elements of the input device 100 according to the exemplary embodiment have been described in detail. Elements of the display apparatus 200 described above will now be described in detail.

Figure 3:
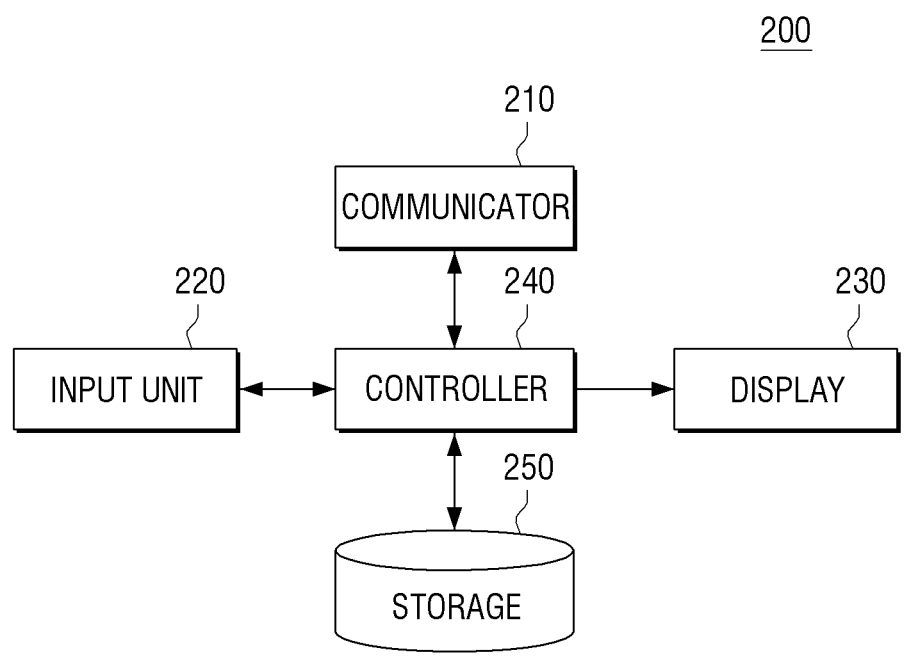
FIG. 3 is a block diagram of a display apparatus according to an exemplary embodiment.

FIG. 3 is a block diagram illustrating the display apparatus 200, according to an exemplary embodiment.

As shown in FIG. 3, the display apparatus 200 may be an electronic apparatus such as an electronic bulletin board, a smart phone, or the like. In particular, the display apparatus 200 may be an electronic apparatus on which a decompression type touch input may be performed. The display apparatus 200 includes a communicator 210, an input unit 220, a display 230, a controller 240, and a storage 250.

The communicator 210 communicates with the input device 100. The communicator 210 may be implemented as a communication module such as an LAN module (not shown), a wireless communication module (not shown), or the like. The LAN module is a communication module that communicates with the input device 100 positioned at a short distance, for example, may be Bluetooth, Zigbee, NFC, or the like. The wireless communication module is a communication module that communicates with an external terminal device (not shown) according to a wireless communication protocol such as WiFi, IEEE, or the like. The wireless communication module may further include a mobile communication module that accesses a mobile communication network according to various mobile communication standards, such as 3rd Generation (3G), 3rd Generation Partnership Project (3GPP), Long Term Evolution (LTE), etc., to communicate with an external server.

The input unit 220 receives a touch of the input device 100 and various user commands. The input unit 220 may be implemented as a touch pad, a keypad including various functional keys, numerical keys, special keys, letter keys, etc., or a touch screen type input panel.

The display 230 displays a pattern image based on a touch input of the input device 100. The display 230 may be implemented as a liquid crystal display (LCD), an organic light-emitting display diode (OLED), a plasma display panel (PDP), or the like. In particular, the display 230 may be implemented as a touch-type screen that forms a layer structure along with the input unit 220 such as the touch pad.

The controller 240 controls overall operations of the elements of the display apparatus 200. In particular, in response to an event signal for cancelling a job being received from the input device 100 through the communicator 210, the controller 240 controls the display 230 to display a pattern image edited based on the received event signal.

The storage 250 may store various types of data for driving and controlling the display apparatus 200, an Operating System (OS), etc. In particular, the storage 250 may store a coordinate value acquired by the touch input of the input device 100 and execution information for cancelling a job for a displayed pattern image based on the touch input of the input device 100. The coordinate value stored in the storage unit 250 is a coordinate value of a point at which the touch input of the input device 100 is input through a touch screen of the display apparatus 200. The execution information stored in the storage 250 may be information indicating a section for performing an editing job, such as deleting, with respect to the corresponding pattern image based on a last stored one of coordinate values forming the pattern image based on the event signal received from the input device 100.

For example, in response to a first event signal being received from the input device 100, the controller 240 may acquire a coordinate value of a currently displayed pattern image from among coordinate values of a plurality of pattern images stored in the storage 250 and first execution information which corresponds to the first event signal. The controller 240 acquires all coordinate values belonging to a section which corresponds to the first execution information based on the last stored one of the acquired coordinate values. The controller 240 deletes a pattern section which corresponds to the all coordinate values belonging to the corresponding section. Therefore, the display 230 may display the pattern image from which the pattern section corresponding to the first event signal has been deleted.

The display apparatus 200 described above may sense a touch area of the input device 100 by using a capacitive method. In this case, the display apparatus 200 may include elements as shown in FIG. 4.

Figure 4:
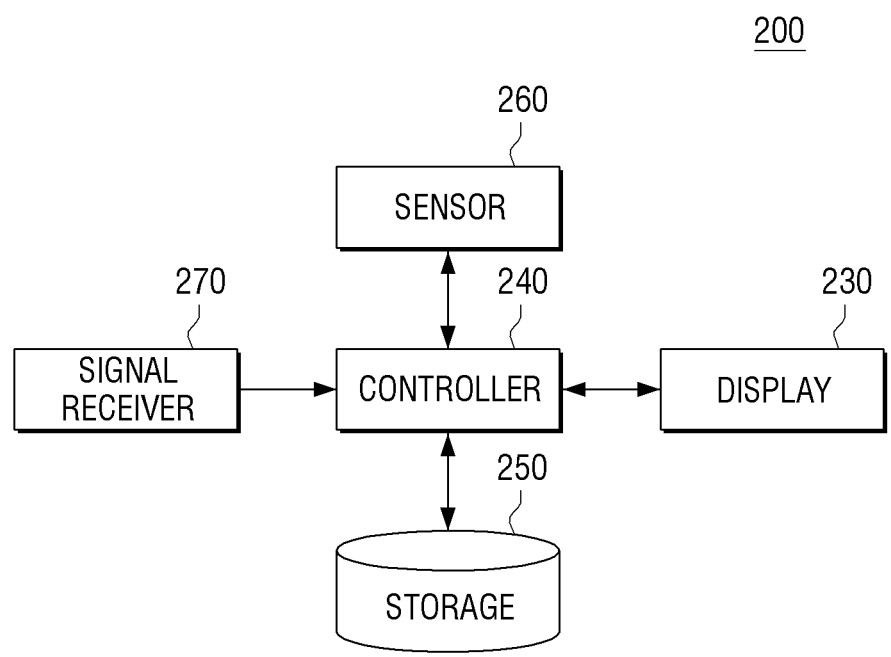
FIG. 4 is a block diagram of a display apparatus according to another exemplary embodiment.

FIG. 4 is a block diagram of the display apparatus 200, according to another exemplary embodiment.

In response to display apparatus 200 sensing a touch area of the input device 100, by using a capacitive method as shown in FIG. 4, the display apparatus 200 may further include a sensor 260 and a signal receiver 270 in addition to the elements of FIG. 3.

The signal receiver 270 receives a magnetic field signal output from the input device 100, and the sensor 260 processes the magnetic field signal received through the signal receiver 270 to sense the touch area of the input device 100. An operation of the display apparatus 200 to recognize the magnetic field signal output from the input device 100 to sense the touch area has been briefly described above. This method is a well-known technique, and thus its detailed description is omitted herein.

In response to a particular magnetic field signal being received, which is different from the magnetic field signal received through the signal receiver 270, the controller 240 determines whether the received particular magnetic field signal is a signal for cancelling a job for a pattern image displayed on a screen. According to exemplary embodiments, the controller 240 may determine whether a bandwidth of a frequency signal as a magnetic field signal exceeds a preset threshold frequency bandwidth and determine whether the received magnetic field signal is a signal for cancelling the job for the pattern image, according to the determination result. However, the inventive concept is not limited thereto, and thus the controller 240 may determine whether the bandwidth of the frequency signal as the magnetic field signal is less than the preset threshold frequency bandwidth and determine whether the received magnetic field signal is the signal for cancelling the job for the pattern image, according to the determination result.

In response to a determination that the bandwidth of the received frequency signal exceeds the bandwidth of the preset threshold frequency, the controller 240 determines that the received magnetic field signal is the signal for cancelling the job for the pattern image displayed on the screen. The controller 240 performs an editing job, such as deleting, with respect to the pattern image displayed on the screen. Therefore, the display unit 230 may display the pattern image that has been edited by the editing job.

The elements of the input device 100 and the elements of the display apparatus 200 according to the exemplary embodiments have been described in detail. Operations of the input device 100 and the display apparatus 200 according to various exemplary embodiments will now be described in detail.

Figure 5:
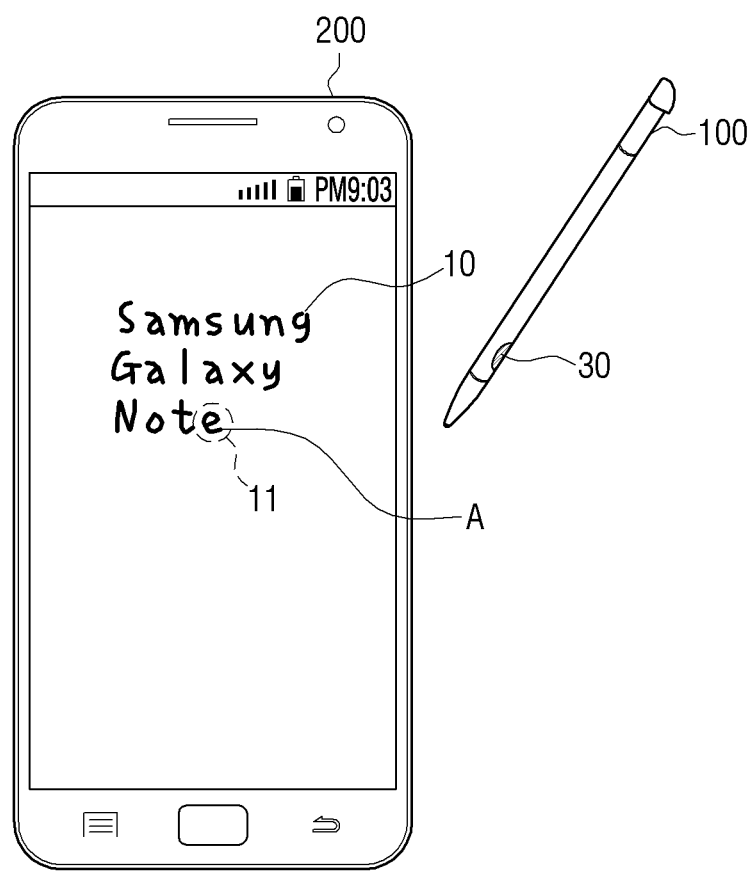
FIG. 5 is a view which illustrates a pattern image that is displayed based on a touch input of an input device in a display apparatus, according to an exemplary embodiment.
Figure 6:
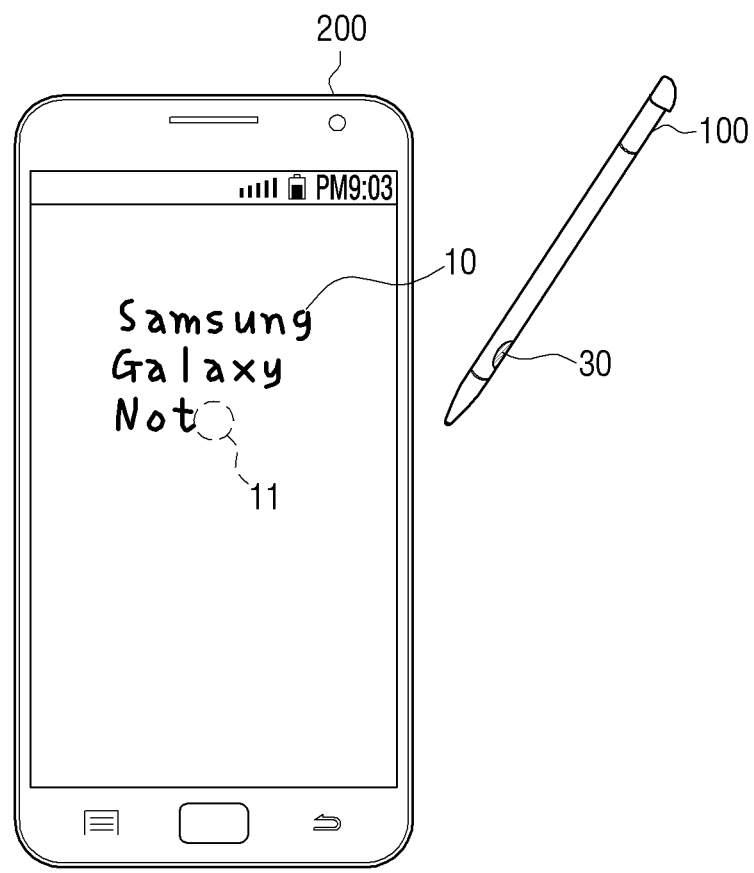
FIG. 6 is a view which illustrates a process of cancelling a job for a pattern image based on a sound intensity sensed through an input device in a display apparatus, according to an exemplary embodiment.
Figure 7:
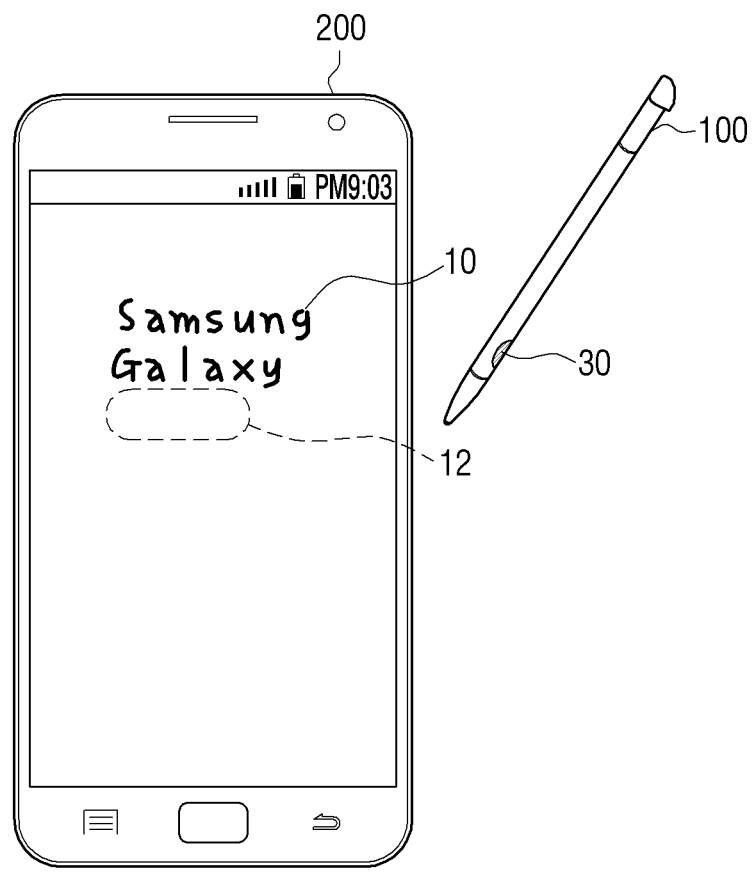
FIG. 7 is a view which illustrates a process of cancelling a job for a pattern image based on a sound intensity sensed through an input device in a display apparatus, according to another exemplary embodiment.

FIG. 5 is a view which illustrates a pattern image that is displayed in a display apparatus based on a touch input of an input device, according to an exemplary embodiment. FIG. 6 is a view which illustrates a process of cancelling a job for a pattern image based on a sound intensity sensed through an input device in a display apparatus, according to an exemplary embodiment. FIG. 7 is a view which illustrates a process of cancelling a job for a pattern image based on a sound intensity sensed through an input device in a display apparatus, according to another exemplary embodiment.

As shown in FIG. 5, the display apparatus 200 may display a pattern image 10 "Samsung Galaxy Note" based on a touch input of the input device 100. The display apparatus 200 may store a coordinate value of the pattern image 10 "Samsung Galaxy Note." When the pattern image 10 "Samsung Galaxy Note" is displayed on the touch screen of the display apparatus 200, the user may make a wind sound "puff" to delete a portion of the pattern image 10 and re-write the pattern image 10. Therefore, a microphone 30 provided in an area of a side of the input device 100 may receive a sound uttered by the user. In response to the sound being input through the microphone 30, the input device 100 determines that a peak level of a volume extracted from the input sound exceeds a preset threshold level. Therefore, the input device 100 generates an event signal for cancelling a job for the pattern image 10 displayed on the touch screen of the display apparatus 200 and transmits the event signal to the display apparatus 200. However, the exemplary embodiments are not limited thereto, and thus, if the peak level of the volume extracted from the input sound exceeds the preset threshold level, the input device 100 may generate and output a particular magnetic field signal related to cancellation of the job for the pattern image 10.

In response the event signal or the magnetic field signal for cancelling the job for the pattern image 10 being generated, the display apparatus 200 may cancel the job for the pattern image 10 displayed on the touch screen based on the event signal or the particular magnetic field signal.

The event signal or the particular magnetic field signal generated from the input device 100 may have different signal types. However, the event signal or the particular magnetic field signal generated from the input device 100 is a signal that allows the display apparatus 200 to cancel the job for the pattern image 10 which is displayed on the touch screen. The display apparatus 200 may analyze the event signal or the particular magnetic field signal generated from the input device 100 with respect to cancellation of the job for the pattern image 10, by using the same method of analysis. Therefore, only an operation of the display apparatus 200 for cancelling the job for the pattern image 10 based on the event signal generated from the input device 100 will now be described.

In response to a peak level of a volume section extracted from a wind sound "puff" exceeding a preset threshold level as described above, the input device 100 determines whether a period of time for maintaining the corresponding volume section is less than or equal to a preset threshold time. For example, the preset threshold time may be 1 second. Therefore, in response to the volume section exceeding the preset threshold level being maintained for less than 1 second, the input device 100 may generate a first event signal to cancel the job for the pattern image 10 in the minimum unit and transit the first event signal to the display apparatus 200.

The minimum unit related to cancellation of the job may be a pattern section in which touch inputs are consecutively performed from the input device 100 in relation to the pattern image 10. In other words, the minimum unit related to the cancellation of the job may be a pattern section in which touch inputs are performed in the stroke from the input device 100 in relation to the pattern image 10.

Therefore, in response to a first event signal being received from the input device 100, the display apparatus 200 determines a pattern section of the minimum unit based on one of a plurality of coordinate values last stored in relation to the pattern image 10. As shown in FIG. 5, a coordinate value, which corresponds to point A from among the plurality of coordinate values related to the pattern image 10 "Samsung Galaxy Note," may be stored last. In this case, the display apparatus 200 acquires a coordinate value which corresponds to the point A at which a touch input is performed, and coordinate values of points at which touch inputs are previously consecutively performed in relation to the touch input performed at the point A.

The display apparatus 200 determines a pattern section of the pattern image 10 in which a job is to be cancelled, based on the acquired coordinate values. If a pattern section 11 "e" is determined from the acquired coordinate values as shown in FIG. 5, the display apparatus 200 may display the pattern image 10 from which the pattern section 11 "e" has been deleted, as shown in FIG. 6.

When displaying the pattern image 10 from which the pattern section 11 "e" has been deleted, the display apparatus 200 may receive the first event signal from the input device 100. In this case, the display apparatus 200 acquires a touch input of a coordinate value last stored before a coordinate value of the pattern section 11 "e" is stored, and acquires coordinate values of points at which touch inputs have been consecutively performed in relation to the touch input, and determines a pattern section in which a job is to be cancelled based on the acquired coordinate values. The display apparatus 200 may display the pattern image 10 from which the corresponding pattern section has been deleted.

The input device 100 may receive a longer wind sound than "puff" through the microphone 30. In this case, the input device 100 determines whether a time in which a volume section extracted from the wind sound is maintained is less than or equal to a preset threshold time. As in the above-described example, the preset threshold time may be 1 second, and a volume section exceeding a preset threshold level may be maintained for a time between 1 second and 2 second. In this case, the input device 100 determines that the time for which the volume section extracted from the wind sound is maintained exceeds the preset threshold time. Therefore, the input device 100 may generate a second event signal and transmit the second event signal to the display apparatus 200, wherein the second event signal is to cancel the job for the pattern image 10 in the greater unit than the minimum unit.

Accordingly, in response to the second event signal being received from the input device 100, the display apparatus 200 determines a pattern section which corresponds to the greater unit than the minimum unit based on one of a plurality of coordinate values last stored in relation to the pattern image 10. As shown in FIG. 5, a coordinate value, which corresponds to the point A from among a plurality of coordinate values related to the pattern image 10 "Samsung Galaxy Note," may be stored last. In this case, the display apparatus 200 acquires a coordinate value which corresponds to the point A at which a last touch input has been performed, and coordinate values of points at which touch inputs have been performed by the preset units prior to performing the touch input at the point A.

The display apparatus 200 determines a pattern section of the pattern image 10 from which a job is to be cancelled, based on the acquired coordinate values. In response to a pattern section 12 "note" is determined from the acquired coordinate values, the display apparatus 200 may display the pattern image 10 from which the pattern section 12 "note" has been deleted, as shown in FIG. 7.

In response to a determination that a volume section exceeding a preset threshold level is maintained for 2 or more seconds, the input device 100 may generate a third event signal for cancelling a job related to a deletion of all sections of the pattern image 10 and transmit the third event signal to the display apparatus 200. Therefore, in response to the third event signal being received from the input device 100, the display apparatus 200 may delete all sections of the pattern image 10.

The display apparatus 200 according to the exemplary embodiments may cancel a job for a particular pattern section of a pattern image displayed on a screen, according to an event signal received from the input device 100.

Figure 8:
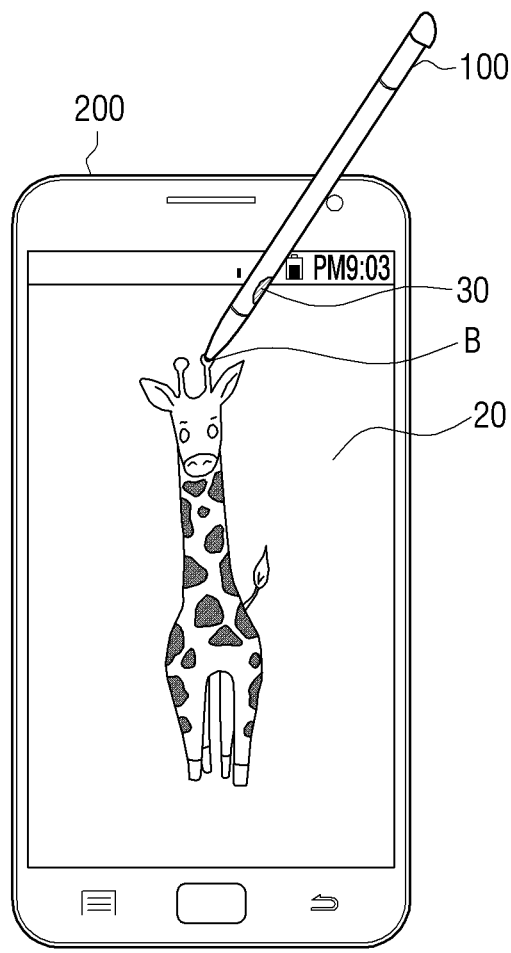
FIG. 8 is a view which illustrates a pattern image that is displayed based on a touch input of an input device in a display apparatus, according to another exemplary embodiment.
Figure 9:
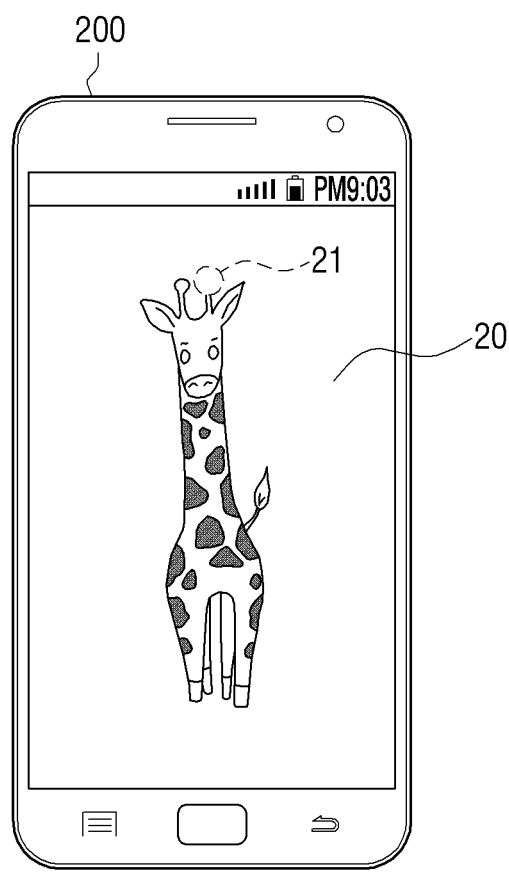
FIG. 9 is a view which illustrates a process of cancelling a job for a particular area of a pattern image based on a sound intensity sensed through an input device in a display apparatus, according to an exemplary embodiment.
Figure 10:
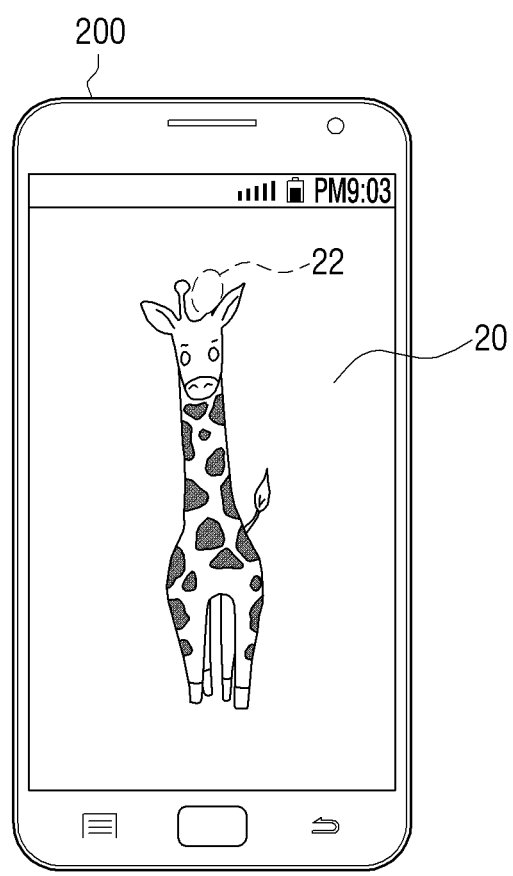
FIG. 10 is a view which illustrates a process of cancelling a job for a particular area of a pattern image based on a sound intensity sensed through an input device in a display apparatus, according to another exemplary embodiment.

FIG. 8 is a view which illustrates a pattern image that is displayed based on a touch input of an input device in a display apparatus, according to another exemplary embodiment. FIG. 9 is a view which illustrates a process of cancelling a job for a particular area of a pattern image based on a sound intensity sensed through an input device in a display apparatus, according to an exemplary embodiment. FIG. 10 is a view which illustrates a process of cancelling a job for a particular area of a pattern image based on a sound intensity sensed through an input device in a display apparatus, according to another exemplary embodiment.

As shown in FIG. 8, the display apparatus 200 may display a character-related pattern image 20 based on a touch input of the input device 100. The display apparatus 200 may also store a coordinate value of the character-related pattern image 20. When the character-related pattern image 20 is displayed, the user deletes a portion of the character-related pattern image 20 and touches a point B, at which a job is to be re-performed, with the input device 100. When the input device 100 touches the point B at which the job is to be re-performed, the user may make a "puff" wind sound. Therefore, the microphone 30 provided in an area of a side of the input device 100 may receive the wind sound uttered by the user.

In response to the wind sound being input through the microphone 30, the input device 100 determines that a peak level of a volume extracted from the input wind sound exceeds a preset threshold level. In response to a peak level of a volume section extracted from the wind sound "puff" exceeding the preset threshold level, the input device 100 determines whether a period of time for which the volume section is maintained is less than or equal to a preset threshold time. As in the above-described example, if the volume section exceeding the preset threshold level is maintained for less than 1 second, the input device 100 may generate a first event signal and transmit the first event signal to the display apparatus 200. The first event signal is to cancel a job for the character-related pattern image 20 in the minimum unit.

Therefore, in response to the first event signal being received from the input device 100, the display apparatus 200 determines a pattern section of the minimum unit based on one of a plurality of coordinate values last stored in relation to the character-related pattern image 20. As described above, the input device 100 may touch a point B at which a job is to be re-performed, according to a control of the user. In this case, the last stored coordinate value may be a coordinate value which corresponds to point B. Therefore, the display apparatus 200 determines a first section 21 including point B which corresponds to the last stored coordinate value, based on a preset condition of execution. In response to a determination of a first section 21 in which a job is to be cancelled, the display apparatus 200 deletes a pattern section of the determined first section 21. As shown in FIG. 9, the display apparatus 200 may display the character-related pattern image 20 from which the pattern section which corresponds to the first section 21 has been deleted.

In response to the input device 100 touching point B at which the job is to be re-performed, the input device 100 may receive through the microphone 30 a longer wind sound than the "puff" described above. In this case, the input device 100 determines that a period of time for which a volume section extracted from the wind sound is maintained exceeds a preset threshold time. Therefore, the input device 100 may generate a second event signal for cancelling the job for the character-related pattern image 20 by a wider section than the first section 21 and transmit the second event signal to the display apparatus 200.

Therefore, in response to the second event signal being received from the input device 100, the display apparatus 200 determines a second section 22 that is wider than the first section 21 based on one of a plurality of coordinate values last stored in relation to the character-related pattern image 20. As described above, the input device 100 may touch point B at which the job is to be re-performed, according to a control of the user. In this case, the last stored coordinate value may be a coordinate value which corresponds to point B. Therefore, the display apparatus 200 determines that the second section 22, including point B which corresponds to the last stored coordinate value based on a preset execution condition. In response to the second section 22 in which the job is to be cancelled being determined as described above, the display apparatus 200 deletes a pattern section which corresponds to the determined second section 22. As shown in FIG. 10, the display apparatus 200 may display the character-related pattern image 20 from which the pattern section which corresponds to the second section 22 has been deleted.

A method of controlling the input device 100 that senses a sound intensity will now be described in detail.

Figure 11:
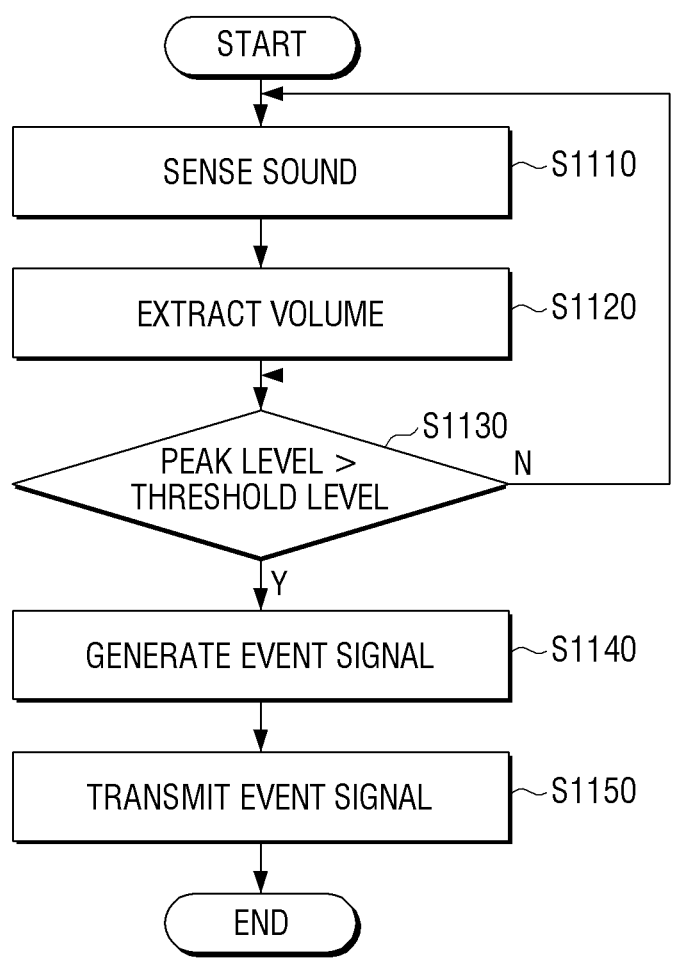
FIG. 11 is a flowchart which illustrates a method of controlling an input device according to an exemplary embodiment.

FIG. 11 is a flowchart which illustrates a method of controlling an input device according to an exemplary embodiment.

Referring to FIG. 11, in operation S1110, the input device 100 senses a sound input through a microphone. In operation S1120, the input device extracts a volume from the sensed sound. In operation S1130, the input device 100 determines whether a peak level of each of the extracted volume sections exceeds a preset threshold level. In response to a determination that the peak level of the extracted volume section is less than the preset threshold level, the input device 100 re-performs operations S1110 and S1120. In response to a determination that the peak level of the extracted volume section exceeds the preset threshold level, the input device 100 generates an event signal for cancelling a job for a pattern image displayed on the display apparatus 200 in operation S1140 and transmits the event signal to the display apparatus 200 in operation S1150.

Therefore, the display apparatus 200 may cancel the job for the displayed pattern image based on the event signal received from the input device 100.

The input device 100 may generate an event signal that is to gradationally cancel jobs for sections of the pattern image displayed on a screen of the display apparatus 200, according to a period of time for which the volume section exceeding the preset threshold level is maintained.

Figure 12:
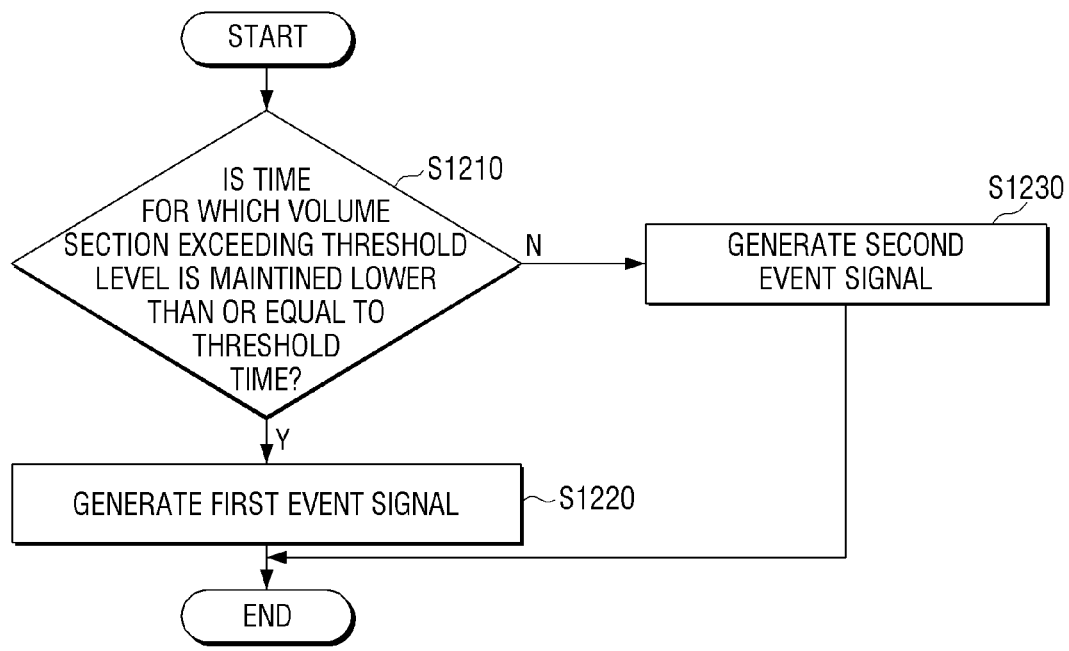
FIG. 12 is a flowchart which illustrates a method of differently generating event signals in order to gradationally perform job cancelling sections for a pattern image in an input device according to an exemplary embodiment.

FIG. 12 is a flowchart which illustrates a method of differently generating an event signal to gradationally cancel jobs for sections of a pattern image in an input device according to an exemplary embodiment.

Referring to FIG. 12, in operation S1210, the input device 100 determines whether a period of time for which a volume section exceeding a threshold level is maintained is less than or equal to a preset threshold time. In response to a determination that the time period is less than or equal to the preset threshold time, the input device 100 generates a first event signal for cancelling a job for a preset first section based on one of coordinate values last stored in the display apparatus 200, in operation S1220.

Therefore, the display apparatus 200 may delete the first selection of the pattern image displayed on the screen based on the first event signal received from the input device 100. Herein, the display apparatus 200 may delete a pattern section which corresponds to a coordinate value belonging to the first section based on one of coordinate values last stored in relation to the pattern image.

In response to a determination in operation S1210 that the period of time exceeds the preset threshold time, the input device 100 generates a second even signal for cancelling a job for a second section that is wider than the first section based on one of the coordinate values last stored in the display apparatus 200 in operation S1230.

Therefore, the display apparatus 200 may delete the second section of the pattern image displayed on the screen based on the second event signal received from the input device 100. Here, the display apparatus 200 may delete a pattern section which corresponds to a coordinate value belonging to the second section based on one of the coordinate values last stored in relation to the pattern image.

Figure 13:
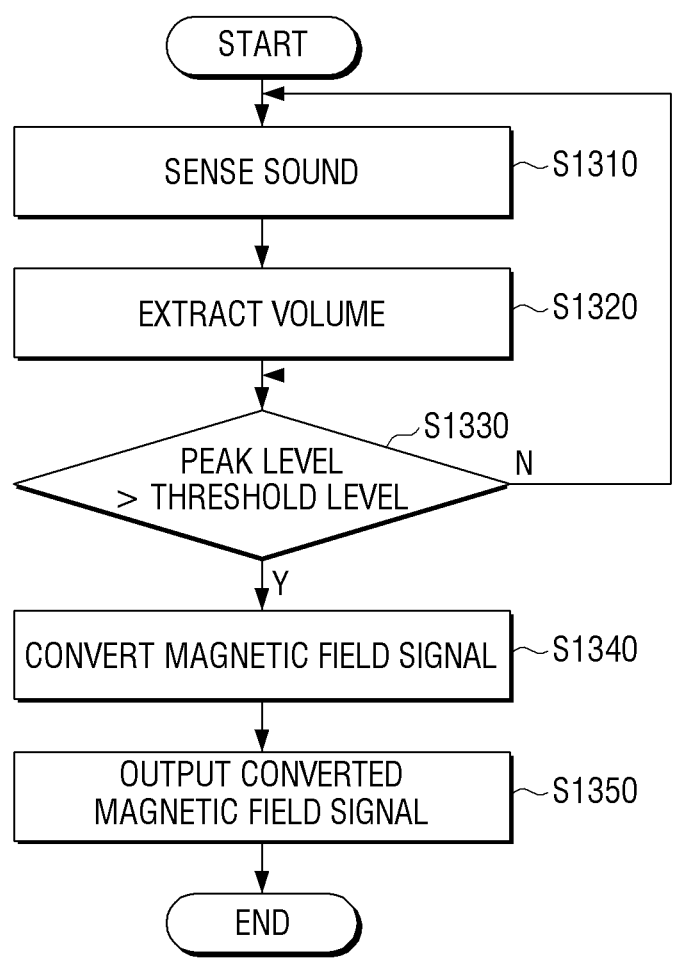
FIG. 13 is a flowchart which illustrates a method of controlling an input device according to another exemplary embodiment.

FIG. 13 is a flowchart which illustrates a method of controlling an input device according to another exemplary embodiment.

Referring to FIG. 13, in operation S1310, the input device 100 that performs a touch input on the display apparatus 200, of a capacitive type, senses a sound input through a microphone. In operation S1320, the input device 100 extracts a volume from the sensed sound. In operation S1330, the input device 100 determines whether a peak level of each of the extracted volume sections exceeds a preset threshold level. In response to a determination in operation S1330 that the peak level of the extracted volume section is less than or equal to the preset threshold level, the input device 100 re-performs operations S1310 and S1320. In response to a determination in operation S1330 that the peak level of the extracted volume section exceeds the preset threshold level, the input device 100 generates or converts a magnetic field signal related to a cancellation of a job for a pattern image displayed on the display apparatus 200 in operation S1340. The input device 100 generates and outputs a magnetic field signal related to the cancellation of the job from the magnetic field signal output in relation to the job for the pattern image in operation S1350. In other words, the input device 100 may generate and output a frequency signal which is different from a frequency signal output in relation to the job for the pattern image.

The input device 100 may gradationally generate or convert and output a magnetic field signal for cancelling the job for the pattern image according to a period of time for which the volume section exceeding the threshold level is maintained.

Figure 14:
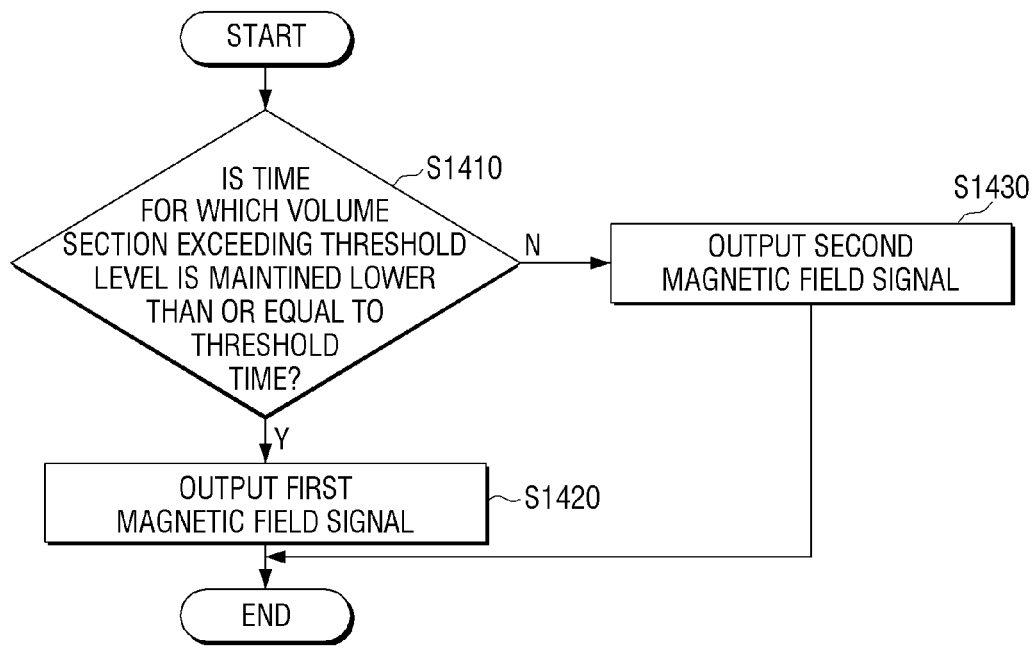
FIG. 14 is a flowchart which illustrates a method of differently generating magnetic field signals to gradationally perform job cancelling jobs for a pattern image in an input device according to an exemplary embodiment.

FIG. 14 is a flowchart which illustrates a different method of generating a magnetic field signal to gradationally cancel jobs for sections of a pattern image in an input device, according to an exemplary embodiment.

Referring to FIG. 14, in operation S1410, the input device 100 determines whether a period of time for which a volume section exceeding a threshold level being maintained is less than or equal to a preset threshold time. In response to a determination in operation S1410 that the period of time is less than or equal to the preset threshold time, the input device 100 generates a first magnetic field signal that is used to cancel a job for a preset first section based on one of coordinate values last stored in the display apparatus 200 in operation S1420.

Therefore, the display apparatus 200 may delete the first section of a pattern image displayed on a screen based on a first frequency signal that is a first magnetic field signal output from the input device 100. Herein, the display apparatus 200 may delete a pattern section which corresponds to a coordinate value belonging to the first section based on one of the coordinate values last stored in relation to the pattern image.

In response to a determination in operation S1410 that the period time exceeds the preset threshold time, the input device 100 generates a second magnetic field signal for cancelling a job for a second section that is wider than the first section based on one of the coordinate values last stored in the display apparatus 200 in operation S1430.

Therefore, the display apparatus 200 may delete the second section of the pattern image displayed on the screen based on the second magnetic field signal received from the input device 100. Here, the display apparatus 200 may delete a pattern section which corresponds to a coordinate value belonging to the second section based on one of the coordinate values last stored in relation to the pattern image.

As described above, according to various exemplary embodiments, various jobs related to a pattern image may be further conveniently and intuitively performed on a touch screen of a display apparatus by using an input device.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An input device comprising:
 a communicator configured to communicate with a display apparatus;
 a sensor configured to sense a sound;
 a volume extractor configured to extract volume sections from the sound sensed by the sensor; and
 a controller configured to determine whether a peak level of each of the volume sections extracted by the volume extractor exceeds a threshold level, and in response to determining the peak level of a volume section among the volume sections exceeds the threshold level, control the communicator to generate an event signal for cancelling a job for a pattern image displayed on the display apparatus based on a touch input and transmit the event signal to the display apparatus.

2. The input device of claim 1, wherein the controller is configured to generate an event signal for gradationally cancelling jobs for sections of the pattern image according to a time for which the volume section having the peak level exceeding the threshold level is maintained.

3. The input device of claim 2, wherein the controller is configured to generate a first event signal for cancelling a job for a first section of the pattern image based on one of coordinate values last stored in the display apparatus in relation to the pattern image in response to the time for which the volume section having the peak level exceeding the threshold level is maintained being less than or equal to a threshold time.

4. The input device of claim 3, wherein the controller is configured to generate a second event signal for cancelling a job for a second section of the pattern image that is wider than the first section of the pattern image based on one of the coordinate values last stored in the display apparatus in response to the time for which the volume section having the peak level exceeding the threshold level is maintained exceeding the threshold time.

5. The input device of claim 3, wherein the coordinate values stored in the display apparatus are coordinate values that are detected from points of a touch screen of the display apparatus that are touched in relation to the pattern image.

6. An input device configured to control a display apparatus that recognizes a magnetic field signal to sense a touch input and displays a pattern image based on the touch input, the input device comprising:
 a signal generator configured to generate the magnetic field signal;
 a sensor configured to sense a sound;
 a volume extractor configured to extract volume sections from the sound sensed by the sensor; and
 a controller configured to determine whether a peak level of each of the volume sections extracted by the volume extractor exceeds a threshold level, and in response to determining that the peak level of a volume section among the volume sections exceeds the threshold level, control the signal generator to generate a magnetic field signal for cancelling a job for the pattern image displayed on the display apparatus.

7. The input device of claim 6, wherein the controller is configured to control the signal generator to generate a magnetic field signal for gradationally cancelling jobs for sections of the pattern image according to a time for which the volume section having the peak level exceeding the threshold level is maintained.

8. The input device of claim 7, wherein the controller is configured to control the signal generator to generate a first magnetic field signal for cancelling a job for a first section of the pattern image based on one of coordinate values last stored in the display apparatus in relation to the pattern image in response to the time for which the volume section having the peak level exceeding the preset threshold level is maintained being less than or equal to a threshold time.

9. The input device of claim 8, wherein the controller is configured to control the signal generator to generate a second magnetic field for cancelling a job for a second section of the pattern image that is wider than the first section of the pattern image based on one of the coordinate values last stored in the display apparatus in response to the time for which the volume section having the peak level exceeding the preset threshold level is maintained being greater than the threshold time.

10. A display apparatus comprising:
   a communicator configured to communicate with an input device;
   an input unit configured to receive a touch input of the input device;
   a display configured to display a pattern image based on the touch input of the input device; and
   a controller configured to, in response an event signal for cancelling a job being received from the input device through the communicator, control the display unit to display an edited pattern image based on the event signal,
   wherein the event signal for cancelling a job is generated in response to determining that a peak level of a volume section among a plurality of volume sections exceeds a threshold value.

11. A display apparatus comprising:
   a signal receiver configured to receive a magnetic field signal output from an input device;
   a sensor configured to process the received magnetic field signal to sense a touch area of the input device;
   a display configured to display a pattern image based on the sensed touch area; and
   a controller configured to, in response to a particular magnetic field signal different from the magnetic field signal being received through the signal receiver, control the display unit to display the pattern image edited according to whether the particular magnetic field signal is a signal related to a cancellation of a job for the pattern image,
   wherein the signal related to a cancellation of a job for the pattern image is generated in response to determining that a peak level of a volume section among a plurality of volume sections exceeds a threshold level.

12. A method of controlling an input device, the method comprising:
   sensing a sound;
   extracting volume sections from the sensed sound;
   determining whether a peak level of each of the volume sections exceeds a threshold level;
   in response to determining that the peak level of a volume section among the volume sections exceeds the threshold level, generating an event signal for cancelling a job for a pattern image displayed in a display apparatus based on a touch input; and
   transmitting the event signal to the display apparatus.

13. The method of claim 12, wherein the generating the event signal comprises generating the event signal for gradationally cancelling jobs for sections of the pattern image according to a time for which the volume section having the peak level exceeding the threshold level is maintained.

14. The method of claim 13, wherein the generating of the event signal comprises generating a first event signal for cancelling a job for a preset first section of the pattern image based on one of coordinate values last stored in a display apparatus in relation to the pattern image in response to the time for which the volume section having the peak level exceeding the threshold level is maintained being less than or equal to a threshold time.

15. The method of claim 14, wherein the generating of the event signal comprises generating a second event signal for cancelling a job for a second section of the pattern image that is wider than the first section of the pattern image based on one of the coordinate values last stored in the display apparatus in response to the time for which the volume section having the peak level exceeding the threshold level is maintained being greater than the threshold time.

16. The method of claim 14, wherein the coordinate values stored in the display apparatus are coordinate values that are detected from points of a touch screen of the display apparatus that are touched in relation to the pattern image.

17. A method of controlling an input device configured to control a display apparatus that recognizes a magnetic field signal to sense a touch input and displays a pattern image based on the touch input, the method comprising:
   sensing a sound;
   extracting volume sections from the sensed sound;
   determining whether a peak level of each of the extracted volume sections exceeds a threshold level; and
   in response to determining that the peak level of a volume section among the volume sections exceeds the threshold level, generating a magnetic field signal for cancelling a job for the pattern image displayed on the display apparatus.

18. The method of claim 17, wherein the generating the magnetic field signal comprises generating a magnetic field signal for gradationally cancelling jobs for sections of the pattern image according to a period of time for which the volume section having the peak value exceeding the threshold level is maintained.

19. The method of claim 18, wherein the generating the magnetic field signal comprises generating a first magnetic field signal for cancelling a job for a preset first section of the pattern image based on one of coordinate values last stored in the display apparatus in relation to the pattern image in response to the time for which the volume section having the peak value exceeding the threshold level is maintained being less than or equal to a threshold time.

20. The method of claim 19, wherein the generating the magnetic field signal comprises generating a second magnetic field signal for cancelling a job for a preset second section based on one of the coordinate values last stored in the display apparatus in response to the time for which the volume section having the peak value exceeding the threshold level is maintained being greater than the threshold time.

21. An input device configured to control a display apparatus that senses a touch input of input device and displays a pattern image based on the touch input, the input device comprising:
   a communicator configured to communicate with the display apparatus;
   a sensor configured to sense a sound; and
   a controller configured to, in response to determining that a peak level of the sound exceeds a threshold value, control the communicator to generate an event signal for editing the pattern image displayed on the display apparatus and transmit the event signal to the display apparatus.

22. An input device configured to control a display apparatus that recognizes a magnetic field signal to sense a touch input and displays a pattern image based on the touch input, the input device comprising:
   a signal generator configured to generate the magnetic field signal;
   a sensor configured to sense a sound;
   a controller configured to, in response to determining that a peak level of the sound exceeds a threshold value, control the signal generator to generate a magnetic field signal for editing the pattern image displayed on the display apparatus.

* * * * *